(12) United States Patent
Wayne et al.

(10) Patent No.: US 10,789,511 B2
(45) Date of Patent: Sep. 29, 2020

(54) CONTROLLING AGENTS OVER LONG TIME SCALES USING TEMPORAL VALUE TRANSPORT

(71) Applicant: DeepMind Technologies Limited, London (GB)

(72) Inventors: Gregory Duncan Wayne, London (GB); Timothy Paul Lillicrap, London (GB); Chia-Chun Hung, London (GB); Joshua Simon Abramson, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/601,324

(22) Filed: Oct. 14, 2019

(65) Prior Publication Data
US 2020/0117956 A1 Apr. 16, 2020

Related U.S. Application Data

(60) Provisional application No. 62/745,202, filed on Oct. 12, 2018.

(51) Int. Cl.
G06K 9/62 (2006.01)
G06F 11/30 (2006.01)
G06N 3/08 (2006.01)

(52) U.S. Cl.
CPC ........ G06K 9/6265 (2013.01); G06F 11/3037 (2013.01); G06F 11/3072 (2013.01); G06N 3/08 (2013.01)

(58) Field of Classification Search
None
See application file for complete search history.

(56) References Cited

U.S. PATENT DOCUMENTS

2010/0094788 A1* 4/2010 Schafer ............... G05B 13/027
706/20
2015/0100530 A1* 4/2015 Mnih .................. G06N 3/0454
706/25

(Continued)

FOREIGN PATENT DOCUMENTS

WO 2018083667 5/2018

OTHER PUBLICATIONS

Khan, Arbaaz, Vijay Kumar, and Alejandro Ribeiro. "Learning Sample-Efficient Target Reaching for Mobile Robots." In 2018 IEEE/RSJ International Conference on Intelligent Robots and Systems (IROS), pp. 3080-3087. IEEE, 2018. (Year: 2018).*

(Continued)

Primary Examiner — Alexey Shmatov
Assistant Examiner — Casey R. Garner
(74) Attorney, Agent, or Firm — Fish & Richardson P.C.

(57) ABSTRACT

Methods, systems, and apparatus, including computer programs encoded on computer storage media, for training a neural network system used to control an agent interacting with an environment to perform a specified task. One of the methods includes causing the agent to perform a task episode in which the agent attempts to perform the specified task; for each of one or more particular time steps in the sequence: generating a modified reward for the particular time step from (i) the actual reward at the time step and (ii) value predictions at one or more time steps that are more than a threshold number of time steps after the particular time step in the sequence; and training, through reinforcement learning, the neural network system using at least the modified rewards for the particular time steps.

20 Claims, 5 Drawing Sheets

(56) References Cited

U.S. PATENT DOCUMENTS

2017/0032245 A1* 2/2017 Osband .................... G06N 3/08
2017/0140270 A1* 5/2017 Mnih ...................... G06N 3/04

OTHER PUBLICATIONS

Karbasian, Habib, Majid N. Ahmadabadi, and Babak N. Araabi. "Improving reinforcement learning using temporal-difference network EUROCON2009." In IEEE EUROCON 2009, pp. 1716-1722. IEEE, 2009. (Year: 2009).*
Abdolmaleki et al, "Maximum a Posteriori Policy Optimisation," arXiv, Jun. 14, 2018, 23 pages.
Beattie et al., "DeepMind Lab", arXiv:1612.03801v2, Dec. 13, 2016, 11 pages.
Brady et al., "Visual long-term memory has a massive storage capacity for object details", Proceedings of the National Academy of Sciences of the Unites States of America, Sep. 2008, 105(38):14325-14329.
Dumoulin et al., "A Guide to Convolution Arithmetic for Deep Learing", ariv:1603.07285v2, Jan. 11, 2018, 31 pages.
Espeholt et al, "IMPALA: Scalable Distributed Deep-RL with Importance Weighted Actor-Learner Architectures," arXiv, Jun. 28, 2018, 22 pages.
Graves et al., "Hybrid Computing Using a Neural Network with Dynamic External Memory", Nature, Oct. 2016, 538:471-476.
Graves et al., "Speech Recognition with Deep Recurrent Neural Networks", IEEE International Conference on Acoustics, Speech and Signal Processing, May 2013, pp. 6645-6649.
Ioffe et al., "Batch Normalization: Accelerating Deep Network Training by Reducing Internal Covariate Shift", arXiv:1502.03167v3, Mar. 2, 2015, 11 pages.
Kingma et al., "Adam: A Method for Stochastic Optimization", arXiv:1412.6980v9, Jan. 30, 2017, 15 pages.
Krizhevsky et al [online], "The CIFAR-10 Dataset", 2009, [retreived on Nov. 22, 2019], retreived from: URL< https://www.cs.toronto.edu/~kriz/cifar.html>, 4 pages.
Leibo et al., "Psychlab: A Psychology Laboratory for Deep Reinforcement Learning Agents", arXiv:1801.08116v2, Feb. 4, 2018, 28 pages.
Mnih et al., "Asynchronous Methods for Deep Reinforcement Learning", Proceedings of the 33rd International Conference on Machine Learning, 2016, 48:1-10.
Roberts et al., "Signal-to-Noise Ratio Analysis of Policy Gradient Algorithms", Advances in Neural Information Processing Systems 21, 2008, 8 pages.
Schulman et al., "High-Dimensional Continuous Control Using Generalized Advantage Estimation", arXiv:1506.02438v6, Oct. 20, 2018, 14 pages.
Sutskever, "Training Recurrent Neural Networks", University of Toronto, PhD. Thesis, 2013, 101 pages.
Wayne et al, "Unsupervised Predictive Memory in Goal-Directed Agent," arXiv, Mar. 28, 2018, 57 pages.
Zhang et al., "Deep Residual Learning for Image Recognition", IEEE Conference on Computer Vision and Pattern Recognition (CVPR), 2016, pp. 770-778.
Hung et al., "Optimizing Agent Behavior over Long Time Scales by Transporting Value," https://arxiv.org/abs/1810.06721v1, Oct. 2018, 60 pages.
Ke et al, "Sparse Attentive Backtracking: Temporal Credit Assignment Through Reminding," https://arxiv.org/abs/1809.03702, Sep. 2018, 13 pages.
Oh et al., "Value Prediction Network," https://arxiv.org/abs/1707.03497, Nov. 2017, 16 pages.
PCT International Search Report and Written Opinion in International Appln. No. PCT/EP2019/077704, dated Jan. 17, 2020, 16 pages.
Pritzel et al., "Neural Episodic Control," https://arxiv.org/abs/1703.01988, Mar. 2017, 12 pages.
Tamar et al., "Value Iteration Networks," https://arxiv.org/abs/1602.02867, last revised Mar. 2017, 16 pages.

* cited by examiner

CONTROLLING AGENTS OVER LONG TIME SCALES USING TEMPORAL VALUE TRANSPORT

CROSS-REFERENCE TO RELATED APPLICATION

This application claims priority to U.S. Provisional Application No. 62/745,202, filed on Oct. 12, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains a neural network system to control an agent interacting with an environment.

Thus in one aspect a method of training a neural network system used to control an agent interacting with an environment to perform a specified task comprises causing the agent to perform a task episode in which the agent attempts to perform the specified task. At each of a sequence of time steps during the task episode the method may comprise obtaining an observation characterizing a current state of the environment; selecting, from the observation and using the neural network system, an action to be performed by the agent in response to the observation; generating, using the neural network system, a value prediction representing a value of the environment being in the current state to successfully performing the specified task; causing the agent to perform the selected action; and, in response, receiving an actual reward characterizing a progress made in the environment as a result of the agent performing the selected action. For each of one or more particular time steps in the sequence the method may further comprise generating a modified reward for the particular time step from (i) the actual reward at the time step and (ii) value predictions at one or more time steps that are more than a threshold number of time steps after the particular time step in the sequence. The method may further comprise training, through reinforcement learning, the neural network system using at least the modified rewards for the particular time steps.

Implementations of the method address a problem of long-term credit assignment and by doing so may significantly expand the range of decision making problems that can be addressed computationally, e.g., deciding what action to perform at a particular time based on past events. The modified reward allows the significance of a past event to be re-evaluated based on its contribution to a future reward. The threshold number of steps may be such that rewards irrelevant to the task are received between the time step and the later value prediction, e.g., there may be a "distractor task" in between; and/or the threshold number of steps may be greater than a reward half-life (in units of time steps), i.e., in a case where future rewards (after the time step) are discounted by a factor $\gamma$ the threshold number of steps may be $1/(1-\gamma)$. Thus, in general, implementations of the method may take into account rewards that are only received after a long time period has elapsed since the particular time step.

The method may be applied to any reinforcement learning technique. In general a reinforcement learning technique may be a technique that adapts parameters of the neural network system used to control the agent, e.g., using a gradient descent technique, based on the reward(s) received such that over time the agent learns to perform the specified task. The gradient descent technique may involve backpropagation of gradients of a loss function which depends on the reward(s) received. Implementations of the method modify the reward seen by the reinforcement learning technique, which may otherwise operate in its usual manner. Thus the method is not restricted to use with particular reinforcement learning techniques or neural network system architectures. In some implementations, however, the neural network system is configured to learn to perform the specified task by backpropagation of gradients of a policy gradient loss function.

One way of generating the modified reward involves storing relevant information e.g., perceptual and event information, in an external memory. This information may then be identified and accessed to evaluate which past events contribute to a future reward. Knowing which past events contribute to a future reward facilitates generating a modified reward for a past event from the value prediction(s) associated with the future reward.

Thus in some implementations the neural network system is augmented with an external memory, and one or more read heads for reading data from the external memory. At each time step data may be read from the external memory by each of the one or more read heads and used to determine a (compressed) state representation for the time step, which is then written to the external memory. The state representation may thus have the same dimension as the data read from the external memory. The memory may by indexed by time e.g., it may have a slot for each time step. The state representation may comprise a representation of an observation of the environment which may include representations of a previous action and reward; in a recurrent neural network system it may include a hidden state of the system at a previous time step; it may also include a representation of data read from the memory at the previous time step.

The neural network system may be configured to learn to retrieve data from the memory which is relevant to predicting the value function at the time step. More particularly the neural network system may learn to retrieve past memories relevant to selecting the action to be performed. In some implementations the data may be read from the memory based on a similarity measure between a learned read key and the memory/memories indexed by a time step. Each of the read heads may perform a soft read over multiple memory locations based on a similarity measure of the similarity between a respective read key for the time step and a row of the memory. The retrieved data may comprise a weighted combination of previously stored state representations. In a recurrent neural network (RNN) system the state representation for the time step and the retrieved data (for the previous time step) may be used as a recurrent input alongside a hidden state for the RNN system for the previous time step. Learning may be driven by the reinforcement learning technique used, more specifically by the reinforcement learning loss function such as the policy gradient loss.

In some implementations the method may include identifying one or more time steps in the sequence of time steps as a splice time step based on a strength with which data was read from the external memory for the read head at the time step e.g., a weight with which data was read from the external memory for the read head at the time step. The strength may be determined by a read strength parameter that defines how strongly the external memory is read from at the time step e.g., determined or learned by the neural network system. This may be an additional parameter to the similarity measure.

The splice time step may comprise a time step (after the particular, present time step) from which a value prediction is obtained for generating the modified reward. Thus generating the modified reward may include identifying one or more particular time steps that are more than the threshold number of time steps before the splice time step, generating a modification for the reward for each identified time step from a value prediction generated using the data read from the external memory at the splice time step, and applying the modification to the actual reward for the corresponding time step. A splice time step may be one for which the read strength parameter exceeds a threshold; it may be the time step having the highest read strength parameter within a time window in which all of the read strength parameters exceed the threshold.

In some implementations determining the compressed state representation may comprise reconstructing the representation of the observation of the environment, optionally including a representation of a previous action and reward, using a decoder neural network, and training the neural network system including the decoder using a reconstruction loss.

Particular embodiments of the subject matter described in this specification can be implemented so as to realize one or more of the following advantages.

Many complex tasks, e.g., robotic tasks, require correctly performing some action or observing some information at one or more earlier time steps and then using the observed information or the result of the action at one or more much later time steps. Whether or not the action was successfully performed or the needed information was successfully observed at the earlier time steps is not apparent until the much later time steps. Thus, these tasks involve long delays between actions by the agent and consequences of those actions towards successfully completing the specified task.

Conventional reinforcement learning systems are not capable of successfully training a neural network or other control policy that can be used to successfully cause an agent to perform such tasks. In particular, during training, conventional systems can only assign "credit" to actions at a given time step over a relatively short-term because rewards are only based on short-term impacts of actions performed by the agent. The described system, on the other hand, can successfully assign credit to actions from the distant past by modifying rewards at some time steps using value predictions from distant, future time steps. This approach allows the described system to successfully control agents to perform tasks that are intractable for existing systems.

Additionally, because the described approach only modifies the reward using information that would already have been generated at the later time step, it can be used with any existing reinforcement learning technique without a large increase in computational resources consumed by the learning process. In fact, because the described approach allows the system to learn an effective policy for tasks which were intractable for conventional systems, the described approach can reduce the amount of computational resources consumed by a reinforcement learning system because resources are not wasted while the training process diverges or otherwise fails to make progress in determining a successful control policy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
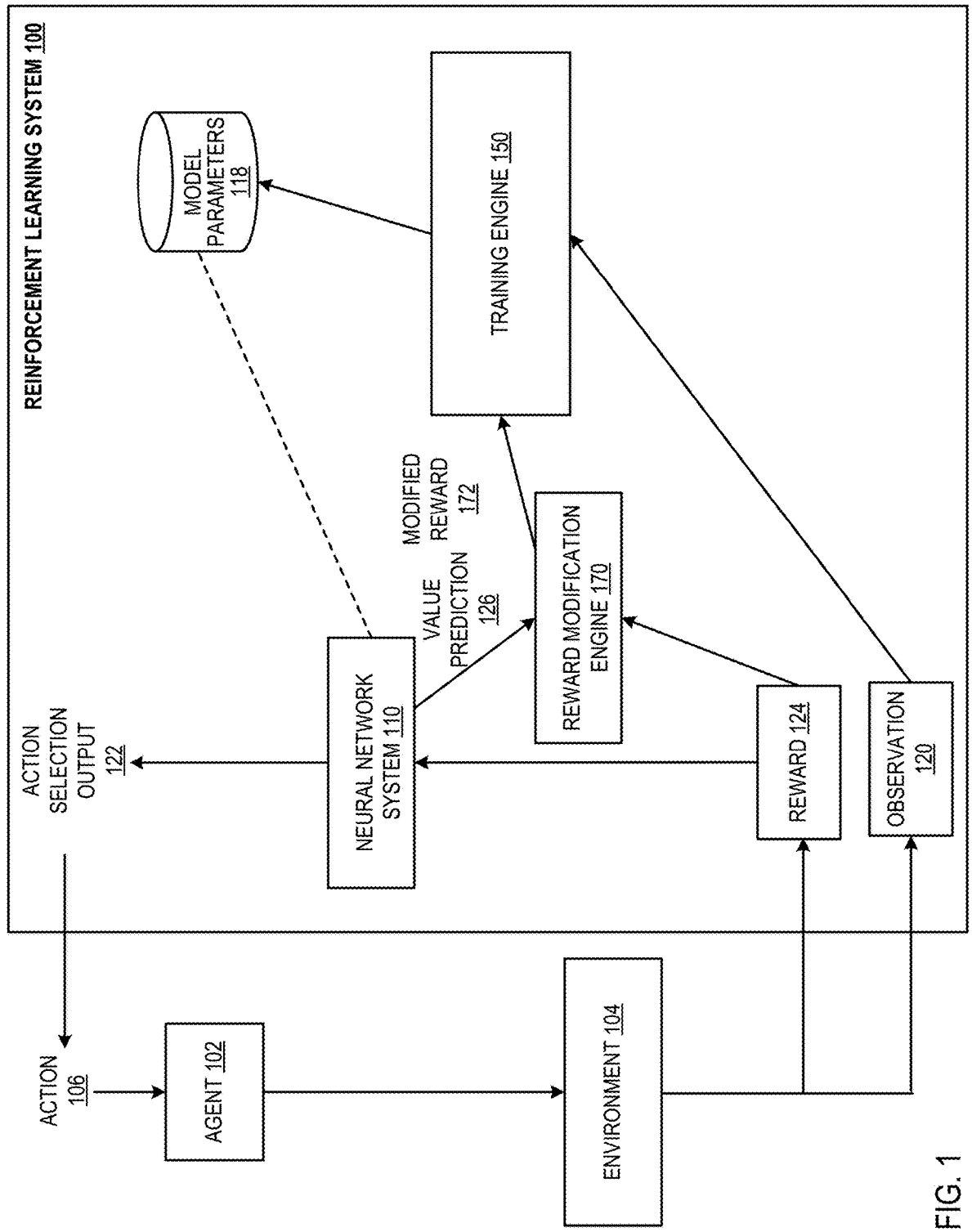
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements e.g., steering control elements of the vehicle, or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g., braking and/or acceleration of the vehicle.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future planned electrical power generation, and the agent may control actions or operations in the plant to achieve this.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g., to adjust or turn on/off components of the plant/facility.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/ intermediates/precursors and/or may be derived from simulation.

In some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In some implementations, the simulated environment may be a simulation of a particular real-world environment. For example, the system may be used to select actions in the simulated environment during training or evaluation of the control neural network and, after training or evaluation or both are complete, may be deployed for controlling a real-world agent in the real-world environment that is simulated by the simulated environment. This can avoid unnecessary wear and tear on and damage to the real-world environment or real-world agent and can allow the control neural network to be trained and evaluated on situations that occur rarely or are difficult to re-create in the real-world environment.

Generally, in the case of a simulated environment, the observations may include simulated versions of one or more of the previously described observations or types of observations and the actions may include simulated versions of one or more of the previously described actions or types of actions.

FIG. 1 shows an example reinforcement learning system 100. The reinforcement learning system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

The system 100 includes a control neural network system 110, a training engine 150, and one or more memories storing a set of model parameters 118 of the control neural network system 110.

At each of multiple time steps, the control neural network system 110 is configured to process an input that includes the current observation 120 characterizing the current state of the environment 104 in accordance with the model parameters 118 to generate an action selection output 122.

The system 100 uses the action selection output 122 to control the agent, i.e., to select the action 106 to be performed by the agent at the current time step in accordance with an action selection policy and then cause the agent to perform the action 106, e.g., by directly transmitting control signals to the agent or by transmitting data identifying the action 106 to a control system for the agent.

A few examples of using the action selection output 122 to select the action 106 to be performed by the agent are described next.

In one example, the action selection output 122 defines a probability distribution over possible actions to be performed by the agent. For example, the action selection output can include a respective action probability for each action in a set of possible actions that can be performed by the agent to interact with the environment. In another example, the action selection output 122 can include parameters of a distribution over the set of possible actions. The system 100 can select the action to be performed by the agent based on the action selection output 122 using any of a variety of action selection policies, e.g., by sampling an action in accordance with the probability values for the actions, or by selecting the action with the highest probability value.

In another example, the action selection output 122 identifies an optimal action from the set of possible actions to be performed by the agent in response to the observation. For example, in the case of controlling a mechanical agent, the action selection output can identify torques to be applied to one or more joints of the mechanical agent. The system 100 can select the action to be performed by the agent based on the action selection output 122 using any of a variety of action selection policies, e.g., by selecting the identified optimal action or by adding noise to the optimal action to encourage exploration and selecting the noise-added action.

In another example, the action selection output 122 may include a respective Q-value for each action in the set of possible actions that can be performed by the agent.

The Q value for an action is an estimate of a "return" that would result from the agent performing the action in response to the current observation 120 and thereafter selecting future actions performed by the agent 102 in accordance with current values of the control neural network parameters.

A return refers to a cumulative measure of "rewards" 124 received by the agent, for example, a time-discounted sum of rewards.

The agent can receive a respective reward 124 at each time step, where the reward 124 is specified by a scalar numerical value and characterizes, e.g., a progress of the agent towards completing a specified task.

In this example, the system 100 can select the action to be performed by the agent based on the action selection output 122 using any of a variety of action selection policies, e.g., by selecting the action with the highest Q value or by mapping the Q values to probabilities and sampling an action in accordance with the probabilities. In some cases, the system 100 can select the action to be performed by the agent in accordance with an exploration policy. For example, the exploration policy may be an E-greedy exploration policy, where the system 100 selects the action to be performed by the agent in accordance with the action selection output 122 with probability 1−Å, and randomly selects the action with probability E. In this example, E is a scalar value between 0 and 1.

In addition to any of the above, the neural network system 110 also generates a value prediction 126 that represents a value of the environment being in the current state to successfully performing the specified task. In other words, the value prediction 126 is an estimate of the return for the specified task resulting from the environment being in the current state characterized by the observation, e.g., an estimate of the time discounted sum of rewards 124 that will be received starting from the current state over the remainder of the task episode or over some fixed number of future time steps if the agent is controlled using outputs of the control neural network system 110. The sum is referred to as time discounted because future rewards are discounted by a fixed time discount factor y when computing the return.

In some cases, the control neural network system 110 directly generates the value prediction 126, i.e., directly generates a value that is a prediction of the time-discounted future return. In other cases, the control neural network system 110 indirectly generates the value prediction 126, i.e., based on other quantities that are output by the neural network system 110. For example, when the neural network system 110 generates Q values, the value prediction 126 can be the highest Q value output for any of the actions in the set of actions.

As part of generating the value prediction 126 and the action selection output 122, the control neural network system 110 reads data from and writes data to an external memory.

In other words, the neural network system 110 is augmented with an external memory, and at each time step, the neural network system reads data from the external memory for each of one or more read heads and writes data to the external memory.

Generally, the neural network system 110 selects the action to be performed at each time step using at least (i) data read from the external memory at a preceding time step or (ii) data read from the external memory at the time step; and generating the value prediction at using at least (i) data read from the external memory at a preceding time step or (ii) data read from the external memory at the time step.

While there are many possible architectures for the control neural network system 110 that employ an external memory, an example of an architecture of a neural network system 110 that reads and writes from a memory is described below with reference to FIG. 4.

The training engine 150 is configured to train the control neural network system 110 by repeatedly updating the model parameters 118 of the control neural network system 110 based on the interactions of the agent with the environment.

During training, the system 100 repeatedly causes the agent to perform episodes of the task while controlled by the control neural network system 110. An episode of the task is a sequence of time steps during which the agent attempts to perform the specified task. For example, the task episode can continue for a predetermined number of time steps or until a reward is received that indicates that the task has been successfully completed. At each time step during a task episode, the system obtains an observation 120 characterizing a current state of the environment and selects, from the observation 120 and using the neural network system 110, an action to be performed by the agent in response to the observation. The system 100 also generates, using the neural network system 110, a value prediction 126 representing a value of the environment being in the current state to successfully performing the specified task. The system 100 then causes the agent to perform the selected action 106 and, in response, receives an actual reward 124 characterizing a progress made in the environment towards completing the task as a result of the agent performing the selected action 106.

In particular, the training engine 150 trains the control neural network system 110 through reinforcement learning.

More specifically, a conventional training engine 150 would train the control neural network system 110 using observations 120 and rewards 124 generated as a result of the agent interacting with the environment during training.

The described system, on the other hand, includes a reward modification engine 170 that modifies the rewards 124 for some of the time steps in a task episode to generate modified rewards 172.

The training engine 150 then trains the control neural network system 110 through reinforcement learning based on the rewards 124 or, for time steps for which modified rewards 172 were generated, the modified rewards 172.

More specifically, for some particular time steps in the task episode, the reward modification engine 170 modifies the reward 124 using a value prediction 126 generated for a significantly later time step in the episode, i.e., for a time step that is more than a threshold number of time steps later in the episode than the particular time step. That is, the system uses the value prediction 126 from a later time step to "bootstrap" the reward 124 for an earlier time step to generate a modified reward that will be used during training in place of the reward 124. Modifying rewards in this manner will be referred to in this specification as "temporal value transport."

Modifying rewards is described in more detail below with reference to FIGS. 2, 3, and 5.

Modifying rewards in this manner allows the training engine 150 to train the control neural network system 100 to more effectively assign credit over long time scales within a task episode, i.e., to more accurately take actions earlier in the episode that may result in significant progress in completing the task much later in the episode.

Generally, the training engine 150 can train the control neural network system 110 to increase the return (i.e., cumulative measure of reward or modified reward) received by the agent using any appropriate reinforcement learning technique, e.g., a policy gradient-based technique.

One example of a technique that can be used by the training engine 150 to train the control neural network system 110 is the Maximum a Posteriori Policy Optimisation (MPO) technique, described in Abdolmaleki, A., et al, Maximum a Posteriori Policy Optimisation, available at arxiv.org/abs/1806.06920.

Another example of a technique that can be used by the training engine 150 to train the control neural network system 110 is the IMPALA V-trace technique, described in Espeholt, L., et al, Impala: Scalable distributed deep-rl with importance weighted actor-learner architectures, arXiv preprint arXiv:1802.01561, 2018.

In some cases, the system 100 uses a distributed framework during training in which multiple agents interact with different replicas of the same environment.

Figure 2:
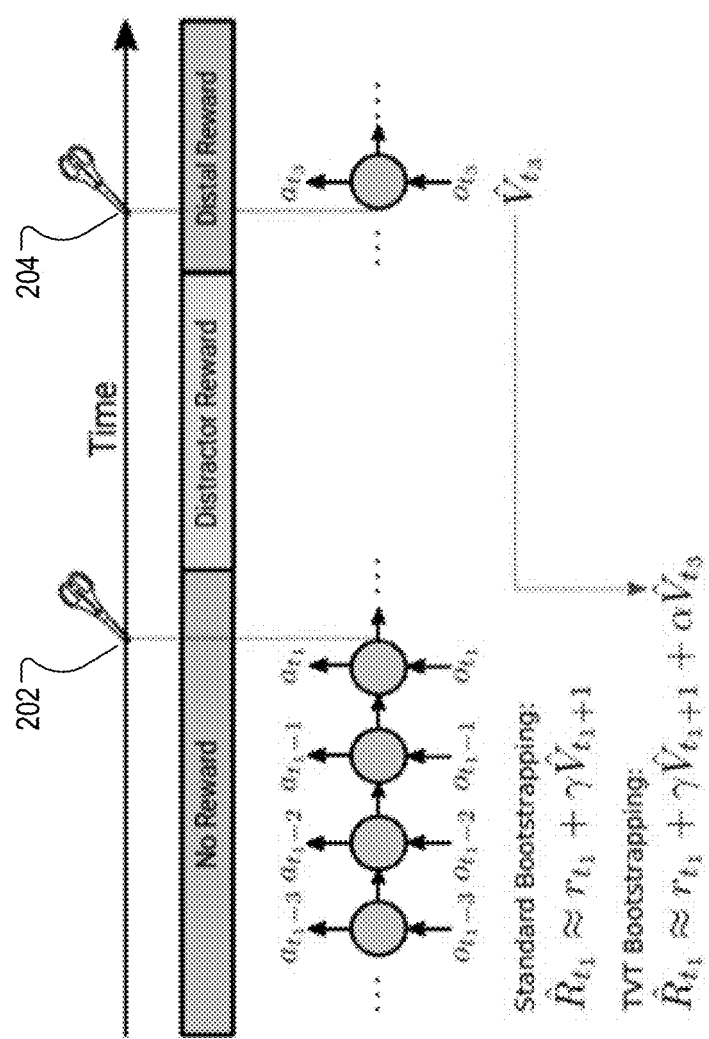
FIG. 2 shows an example of how the system modifies rewards for earlier time steps in a task episode using value predictions at later time steps in the task episode.

FIG. 2 shows an example of how the system modifies rewards for earlier time steps in a task episode using value predictions at later time steps in the task episode. In particular, FIG. 2 shows how the system modifies the reward at a time step 202 in a task episode using a value prediction for a time step 204 in the task episode. Definitions of the symbols in FIG. 2 are given later with reference to FIG. 4.

As can be seen from FIG. 2, the task episode includes three time periods: initial time steps at which no reward is received, intermediate time steps at which some small reward ("distractor reward") may be received that does not depend on what actions were taken at the initial time steps, and later time steps at which a distal reward may be received that, in fact, does depend on what actions were taken at the initial time steps. That is, the reward is "distal" because even though the receipt of the reward is separated by a long amount of time from the initial time steps, whether the reward is received or how much reward is received is still dependent on what took place at those initial time steps. This can be a difficult situation for many conventional reinforcement learning algorithms to account for because the reward at these time steps is determined only on information generated at the time step, i.e., only on the actual reward received at the time step and, in some cases, the value prediction at the next time step. In particular, while some reinforcement learning techniques bootstrap the actual reward at a given time step using "standard bootstrapping" by first adding a value derived from the value prediction at the next time step to the actual reward and then using this bootstrapped reward for reinforcement learning, this standard bootstrapping is insufficient to account for the distal reward shown in FIG. 2.

In particular, at the time step 202 (denoted as time step "$t_1$" in FIG. 2), standard bootstrapping would add, to the actual reward $r_{t_1}$ at the time step 202, a modifier that is a product of the value prediction $\hat{V}_{t_1+1}$ from the next time step and the discount factor γ to generate the bootstrapped return $\hat{R}_{t_1}$.

Temporal value transport (TVT) as described on this specification, on the other hand, would, when certain criteria are satisfied, also add a modifier that is based on a product of the value prediction $\hat{V}_{t_3}$ from the much later time step 204 and a weight a when generating the bootstrapped return $\hat{R}_{t_1}$. An alternative formulation of this modifier that also depends on a read weight generated while reading from an external memory will be described in more detail below with reference to FIG. 5. This can also be seen as using the value prediction $\hat{V}_{t_3}$ from the time step 204 to generate a modified reward $(r_{t_1}+\alpha\hat{V}_{t_3})$ from the actual reward $r_{t_1}$ and then using that modified reward to train the neural network system through reinforcement learning, e.g., in combination with standard bootstrapping as shown in FIG. 2 or using any other reinforcement learning technique.

Generating the modified reward in this manner allows the system to identify that the action performed at time step 202 resulted in the distal reward at a much later time step 204 when learning which actions are best to perform in response to observations like the one received at time step 202.

Figure 3:
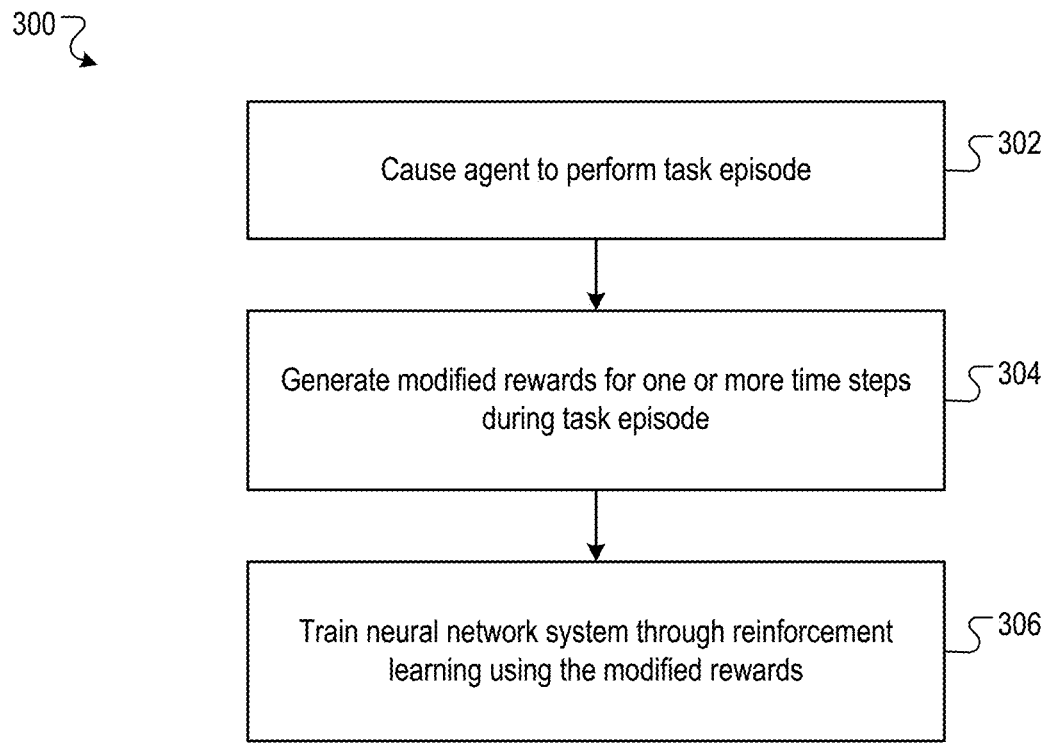
FIG. 3 is a flow diagram of an example process for modifying rewards at time steps in a task episode.

FIG. 3 is a flow diagram of an example process 300 for modifying rewards for time steps in task episode. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system causes the agent to perform a task episode in which the agent attempts to perform the specified task (step 302). For example, the system can cause the agent to perform an action at each time step of a sequence of time steps, e.g., until a reward is received indicating that the task has successfully been performed, until actions have been performed at a threshold number of time steps, or until some other termination criterion has been satisfied.

The system generates modified rewards for each of one or more particular time steps during the task episode, i.e., one or more particular time steps in the sequence of time steps for the task episode (step 304).

Generally, the system first identifies one or more splice time steps that are later in the task episode based on how the system read data from the external memory at the time steps. The system then identifies, for each slice time step, one or more earlier time steps that are more than the threshold value earlier in the episode than the splice time step, and uses the value prediction from the splice time or from the time step immediately after the splice time step to modify the actual rewards for the identified earlier time steps.

More detailed examples of techniques for determining which particular time steps to modify the rewards for and which later time steps to use in modifying the rewards are described in more detail below with reference to FIG. 5.

The system trains the neural network system through reinforcement learning on at least the modified rewards (step 306). That is, the system can use the modified rewards in place of the actual rewards when training the neural network system using any appropriate reinforcement learning technique. For time steps for which the system does not modify the rewards, the system uses the actual rewards when performing the reinforcement learning technique. As described above, for some reinforcement learning techniques, the system applies standard reward bootstrapping to the modified rewards (or the actual rewards for time steps for which the rewards were not modified).

Figure 4:
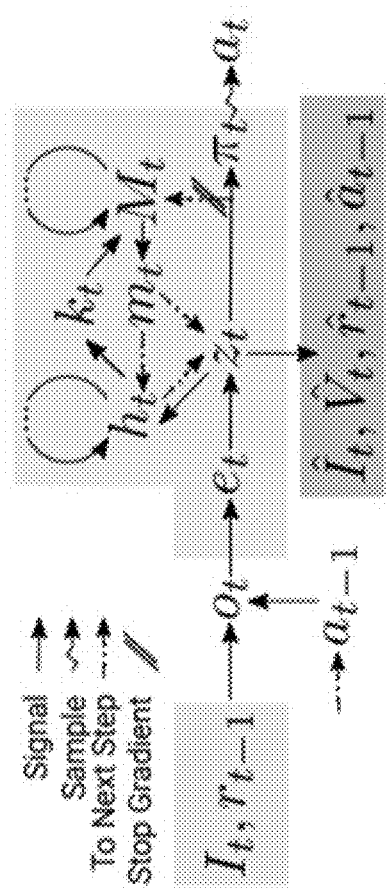
FIG. 4 shows an example of the processing performed by the neural network system to select an action at a time step.

FIG. 4 shows an example of the processing that may be performed by the neural network system at a given time step t.

While FIG. 4 shows a particular example that reads and writes to a memory at different time steps during a task episode, the principles of the described techniques are applicable to any neural network system. More specifically, FIG. 4 describes one configuration of the neural network system, but the temporal value transport techniques described in this specification can be applied to any configuration of a neural network system, including systems that read from and write to an external memory when controlling an agent.

In the example of FIG. 4, an image frame $I_t$ or other sensor data for the time step, the previous reward $r_{t-1}$, and the previous action $a_{t-1}$ here constitute the observation $o_t$ at time step t. These inputs are processed by encoder neural networks and merged into an embedding vector $e_t$, which is to be combined with the output of a recurrent neural network (RNN). For example, $I_t$ $r_{t-1}$ and $a_{t-1}$ can be operated on separately to generate three vectors, and the system can concatenate the three vectors to generate the embedding vector $e_t$. The system can process the image frame $I_t$ using a convolutional neural network, e.g., one with residual blocks of convolutional neural network, to generate a feature map and then flatten the feature map into a vector. The system can then process the flattened feature map through one or more linear layers to generate the final vector for the image frame $I_t$. For the previous reward and previous action, the system can generate a one-hot encoded representation of each as the final vector or can map the one-hot encoded representations into an embedding space to generate the final vectors.

The RNN includes a recurrent, e.g., LSTM, "controller" network h and a memory matrix M of dimension N×W. The output of this RNN and memory system from the previous time step t−1 is the controller output $h_{t-1}$ from the previous time step and one or more memory read vectors, i.e., a respective vector for each of one or more read heads. In other words, the output of this RNN and memory system includes k (a positive integer, e.g., 3) vectors of length W read from memory $m_{t-1} = (m_{t-1}^1, m_{t-1}^2, \ldots, m_{t-1}^k)$, which are referred to as memory read vectors. Together, these outputs are combined with the embedding vector by a feedforward network into a "state representation" $z_t = f(e_t, h_{t-1}, m_{t-1})$. The state representation $z_t$ has the same dimension W as a memory read vector and is inserted into the memory at the next time step into the t-th row: $M_t[t,\cdot] \rightarrow z_t$.

At the time step t, the RNN carries out one cycle of reading from memory and computation. The state representation $z_t$ is provided as input to the RNN, alongside the previous time step's memory read vectors $m_{t-1}$ to produce the next RNN output $h_t$. Then reading memory to produce the current time step's memory read vectors occurs: k read keys $k_t^1, k_t^2, \ldots, k_t^k$ of dimension W are produced as a function of $h_t$ and each key is matched against every row n using a similarity measure $S(k_t^i, M_{t-1}[n,\cdot])$ e.g., a cosine similarity. The similarities are scaled by a positive read strength parameter $\beta_t^i$ which is also computed as a function of $h_t$. For example a linear layer may be applied to $h_t$ to construct a memory interface vector of dimension k×(W+1) having k read keys of length W and k scalars which are passed through a SoftPlus function to create the scalars $\beta_t^1 \ldots \beta_t^k$. A softmax over the scaled weighted similarities is applied to create an attentional read weight vector $w_t^i$ with dimension N, which is used to construct the i-th memory read vector $m_t^i = \Sigma_{n=1}^N w_t^i[n] M_t[n,\cdot]$.

The state representation $z_t$ is also sent to decoder networks whose objective functions require them to produce reconstructions $\hat{I}_t, \hat{r}_{t-1}, \hat{a}_{t-1}$ of the observations (the carets denote approximate quantities produced by networks) while also predicting the value function $\hat{V}_t$. For example, the decoder neural network that generates $\hat{I}_t$ can be a convolutional neural network that applies transposed convolutions in order to map the state representation to an image while the decoders that generate $\hat{r}_{t-1}$ and $\hat{a}_{t-1}$ can each apply one or more linear layers to map the state representation to, respectively a scalar reward value and an action cardinality.

This process ensures that $z_t$ contains useful sensory information in a compressed format. Finally, the state representation $z_t$ and RNN outputs $h_t$ and $m_t$ are provided as input to a policy network to construct the action selection output 7C and an action is sampled from the action selection output π.

Thus, as shown in FIG. 4, different memory heads read data from the memory with different read strengths at different time steps. Because these read strengths determine the magnitude of any given read, larger read strengths imply that more data is required to be read from memory, i.e., from data generated at earlier time steps, in order to effectively select the action at the current time step.

To train the neural network system as described with reference to FIG. 4, the system can train the neural network system to minimize a loss function that includes a policy gradient loss, e.g., through MPO as described above, and, optionally, a reconstruction loss that causes the reconstructions of the observations to match the actual observations received by the system. For example, the reconstruction loss can include a multinomial softmax cross-entropy loss for the action reconstruction decoder, mean-squared error (e.g., Gaussian with fixed variance of 1) loss terms for the reward and the value function decoders, and a Bernoulli cross-entropy loss term for each pixel channel of the images generated by the image decoder.

In some of these cases, the loss function also includes a reading reconstruction loss that imposes a regularization cost whenever a read strength parameter is above a threshold value. As will be evident from the description of FIG. 5 below, including this loss will reduce the number of times the value transport mechanism is triggered, i.e., the reduce the number of earlier time steps that have value transported from later time steps, and can prevent the value transport mechanism from being triggered extraneously during learning.

Example architectures for neural network systems that generate read strengths as part of reading from a memory and examples of loss functions that can be used to train such neural network systems are described in Wayne, G. et al. Unsupervised predictive memory in a goal-directed agent, arXiv preprint arXiv:1803.10760 (2018) and Graves, A. et al. Hybrid computing using a neural network with dynamic external memory, Nature 538, 471 (2016), the entire contents of which are hereby incorporated by reference herein in their entirety.

Figure 5:
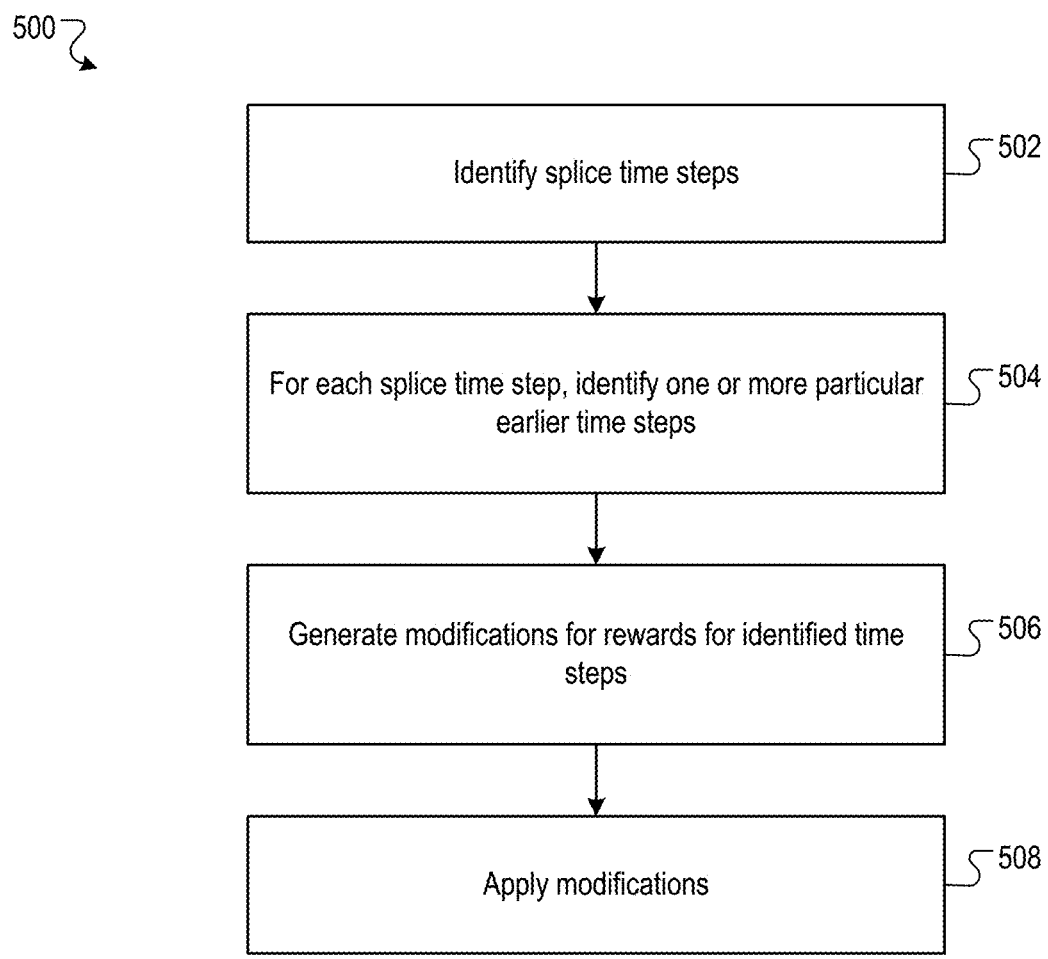
FIG. 5 is a flow diagram of an example process for modifying rewards at time steps in a task episode using read strengths.

FIG. 5 is a flow diagram of an example process 500 for modifying rewards for time steps in a task episode using read strengths. For convenience, the process 500 will be described as being performed by a system of one or more computers located in one or more locations. For example, a reinforcement learning system, e.g., the reinforcement learning system 100 of FIG. 1, appropriately programmed, can perform the process 500.

The system identifies, for each of the one or more read heads, one or more splice time steps from among the sequence of time steps for the task episode based on a strength with which data was read from the external memory for the read head at the time step (step 502). That is, for each read head, the system identifies some subset of the episode time steps as splice time steps based on the strength with which data was read from the external memory for the read head at different episode time steps.

In particular, as described above, when reading data using a read head, the system generates a read strength parameter that defines how strongly the external memory is read from at the time step for the read head.

Generally, the system can identify, as splice time steps for a read head, one or more time steps for which the read strength parameter for the read head exceeds a threshold value. As a particular example, the system can identify each window of (one or more) consecutive time steps for which the read strength parameter for the read head exceeds the threshold value and then identify, as a splice time step, the time step in the window for which the read strength parameter for the read head is the highest. That is, in this particular example, the system selects only a single splice time step for each window of consecutive time steps.

In some implementations, to avoid transporting value to time steps that are too close to any given time step, prior to identifying the windows of time steps, the system sets the read strength parameter for the read head to zero for time steps at which a difference between (i) a time index for the time step, i.e., the value of t for the time step, and (ii) a time index for the time step that has the largest weight of any time steps when reading from the external memory for the read head at the time step is less than a constant value. In other words, the system sets to zero (for the purposes of determine splice time steps) any time steps where the system read strongest from data written at a time step that is too close to the current time step. This prevents time steps at which the system read strongest from data that was written to the memory at a very recent time step from being considered as splice time steps.

For each read head and for each splice time step identified for the read head, the system identifies one or more particular earlier time steps that are more than the threshold number of time steps before the splice time step in the sequence (504). For example, the threshold number can be the half-life value for the time steps, which is a constant value and can be set to, e.g., $1/(1-\gamma)$. That is, the system can, for each splice time step, determine the half-life value and identify, as particular time steps, each time step that is more than the half-life value before the splice time step in the sequence.

For each read head and for each splice time step, the system generates modifications for the actual rewards for the identified particular earlier time steps from the value prediction generated using the data read from the external memory at the splice time step (step 506).

In particular, as described above, when reading from the external memory, for each read head and for each time step, the system assigns a respective weight to the data written to the external memory at each preceding time step, and generates a read vector that combines the data written to the external memory at each preceding time step in accordance with the respective weights. However, the value prediction at a given time step is generated using data read from memory at the preceding time step (and not the given time step). The value prediction generated using the data read from the external memory at the given time step would then be the value prediction at the time step after the given time step, i.e., and not the value prediction at the given time step.

In other configurations of the system, however, the system may use data read from the memory at the given time step when computing the value prediction at the given time step. In these configurations, the value prediction generated using the data read from the external memory at the given time step would then be the value prediction at the given time step.

The system then generates the modification for a given identified time step from (i) a fixed future value discount factor, (ii) the weight assigned to the given identified time step while reading from the external memory at the splice time step for the read head and (iii) the value prediction generated using the data read from the external memory at the splice time step. For example, the modification can be the product of (i), (ii), and (iii).

The system applies the modifications for the read heads to generate the modified rewards for the identified particular earlier time steps (508). When a given earlier time step is modified by only a single modification (i.e., for a single read head), the system can apply the modification by adding the modification to the actual reward at the earlier time step. When a given earlier time step is modified by multiple modifications (i.e., for multiple different read heads), the system can apply the modifications as independent, additive changes to the actual reward at the given earlier time step.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network system augmented with an external memory and used to control an agent interacting with an environment to perform a specified task, the method comprising:
   causing the agent to perform a task episode in which the agent attempts to perform the specified task, comprising, at each of a sequence of time steps during the task episode:
      obtaining an observation characterizing a current state of the environment;
      for each of one or more read heads, reading data from the external memory;
      writing data to the external memory;
      selecting, from the observation and using the neural network system, an action to be performed by the agent in response to the observation, comprising selecting the action using at least (i) data read from the external memory at a preceding time step or (ii) data read from the external memory at the time step;
      generating, using the neural network system, a value prediction representing a value of the environment being in the current state to successfully performing the specified task, comprising generating the value prediction using at least (i) data read from the external memory at a preceding time step or (ii) data read from the external memory at the time step;
      causing the agent to perform the selected action; and
      in response, receiving an actual reward characterizing a progress made in the environment as a result of the agent performing the selected action;
   generating a respective modified reward for each of one or more particular time steps in the sequence, comprising:
      identifying one or more time steps in the sequence of time steps as splice time steps;
      for each splice time step:
         identifying one or more particular time steps that are more than a threshold number of time steps before the splice time step in the sequence; and
         generating a modification for each identified particular time step from a value prediction generated using the data read from the external memory at the splice time step; and
      for each identified particular time step, applying the modifications for the identified particular time step to the actual reward for the identified particular time step; and
   training, through reinforcement learning, the neural network system using at least the modified rewards for the particular time steps.

2. The method of claim 1, wherein identifying one or more time steps in the sequence as splice time steps comprises, for each of the one or more read heads, identifying one or more time steps in the sequence of time steps as a splice time step based on a strength with which data was read from the external memory for the read head at the time step.

3. The method of claim 2,
   wherein reading data from the external memory comprises:
      for each read head, generating a read strength parameter that defines how strongly the external memory is read from at the time step, and
   wherein identifying one or more time steps in the sequence of time steps as a splice time step based on a strength with which data was read from the external memory for the read head at the time step comprises:

identifying, as splice time steps, one or more time steps for which the read strength parameter for the read head exceeds a threshold value.

4. The method of claim 3, wherein identifying, as splice time steps, one or more time steps for which the read strength parameter exceeds a threshold value comprises:
   identifying a window of consecutive time steps for which the read strength parameter for the read head exceeds the threshold value; and
   identifying, as a splice time step, the time step in the window for which the read strength parameter for the read head is the highest.

5. The method of claim 4, wherein identifying, as splice time steps, one or more time steps for which the read strength parameter exceeds a threshold value comprises:
   prior to identifying the window of time steps, setting the read strength parameter for the read head to zero for time steps at which a difference between (i) a time index for the time step and (ii) a time index for the time step that has the largest weight of any time step when reading from the external memory for the read head at the time step is less than a constant value.

6. The method of claim 1, wherein identifying one or more particular time steps that are more than the threshold number of time steps before the splice time step in the sequence comprises:
   determining a half-life value, and
   identifying as particular time steps each time step that is more than the half-life value before the splice time step in the sequence.

7. The method of claim 1, wherein, for each read head and for each time step, reading from the external memory comprises:
   assigning a respective weight to the data written to the external memory at each preceding time step; and
   generating a read vector that combines the data written to the external memory at each preceding time step in accordance with the respective weights.

8. The method of claim 7, wherein generating a modification for each identified time step from a value prediction generated using the data read from the external memory at the splice time step comprises:
   generating the modification for the identified time step from (i) a future value discount factor, (ii) the weight assigned to the identified time step while reading from the external memory at the splice time step and (iii) the value prediction generated using the data read from the external memory at the splice time step.

9. The method of claim 1, wherein training, through reinforcement learning, the neural network system using at least the modified rewards for the particular time steps comprises training the neural network system to minimize a loss function that includes a policy gradient loss.

10. The method of claim 9, wherein the loss function includes a reconstruction loss.

11. The method of claim 9, wherein the loss function includes a reading reconstruction loss that imposes a regularization cost whenever a read strength is above a threshold value.

12. One or more non-transitory computer-readable storage media storing instructions that when executed by one or more computers cause the one or more computers to perform operations of training a neural network system augmented with an external memory and used to control an agent interacting with an environment to perform a specified task, the operations comprising:
   causing the agent to perform a task episode in which the agent attempts to perform the specified task, comprising, at each of a sequence of time steps during the task episode:
      obtaining an observation characterizing a current state of the environment;
      for each of one or more read heads, reading data from the external memory;
      writing data to the external memory;
      selecting, from the observation and using the neural network system, an action to be performed by the agent in response to the observation, comprising selecting the action using at least (i) data read from the external memory at a preceding time step or (ii) data read from the external memory at the time step;
      generating, using the neural network system, a value prediction representing a value of the environment being in the current state to successfully performing the specified task, comprising generating the value prediction using at least (i) data read from the external memory at a preceding time step or (ii) data read from the external memory at the time step;
      causing the agent to perform the selected action; and
      in response, receiving an actual reward characterizing a progress made in the environment as a result of the agent performing the selected action;
   generating a respective modified reward for each of one or more particular time steps in the sequence, comprising:
      identifying one or more time steps in the sequence of time steps as splice time steps;
      for each splice time step:
         identifying one or more particular time steps that are more than a threshold number of time steps before the splice time step in the sequence; and
         generating a modification for each identified particular time step from a value prediction generated using the data read from the external memory at the splice time step; and
      for each identified particular time step, applying the modifications for the identified particular time step to the actual reward for the identified particular time step; and
   training, through reinforcement learning, the neural network system using at least the modified rewards for the particular time steps.

13. A system comprising one or more computers and one or more storage devices storing instructions that when executed by one or more computers cause the one or more computers to perform operations of training a neural network system augmented with an external memory and used to control an agent interacting with an environment to perform a specified task, the operations comprising:
   causing the agent to perform a task episode in which the agent attempts to perform the specified task, comprising, at each of a sequence of time steps during the task episode:
      obtaining an observation characterizing a current state of the environment;
      for each of one or more read heads, reading data from the external memory;
      writing data to the external memory;
      selecting, from the observation and using the neural network system, an action to be performed by the agent in response to the observation, comprising selecting the action using at least (i) data read from the external memory at a preceding time step or (ii) data read from the external memory at the time step;

generating, using the neural network system, a value prediction representing a value of the environment being in the current state to successfully performing the specified task, comprising generating the value prediction using at least (i) data read from the external memory at a preceding time step or (ii) data read from the external memory at the time step;

causing the agent to perform the selected action; and in response, receiving an actual reward characterizing a progress made in the environment as a result of the agent performing the selected action;

generating a respective modified reward for each of one or more particular time steps in the sequence, comprising:

identifying one or more time steps in the sequence of time steps as splice time steps;

for each splice time step:

identifying one or more particular time steps that are more than a threshold number of time steps before the splice time step in the sequence; and generating a modification for each identified particular time step from a value prediction generated using the data read from the external memory at the splice time step; and for each identified particular time step, applying the modifications for the identified particular time step to the actual reward for the identified particular time step; and training, through reinforcement learning, the neural network system using at least the modified rewards for the particular time steps.

14. The system of claim 13, wherein identifying one or more time steps in the sequence as splice time steps comprises, for each of the one or more read heads, identifying one or more time steps in the sequence of time steps as a splice time step based on a strength with which data was read from the external memory for the read head at the time step.

15. The system of claim 14, wherein reading data from the external memory comprises:

for each read head, generating a read strength parameter that defines how strongly the external memory is read from at the time step, and wherein identifying one or more time steps in the sequence of time steps as a splice time step based on a strength with which data was read from the external memory for the read head at the time step comprises:

identifying, as splice time steps, one or more time steps for which the read strength parameter for the read head exceeds a threshold value.

16. The system of claim 15, wherein identifying, as splice time steps, one or more time steps for which the read strength parameter exceeds a threshold value comprises:

identifying a window of consecutive time steps for which the read strength parameter for the read head exceeds the threshold value; and identifying, as a splice time step, the time step in the window for which the read strength parameter for the read head is the highest.

17. The system of claim 16, wherein identifying, as splice time steps, one or more time steps for which the read strength parameter exceeds a threshold value comprises:

prior to identifying the window of time steps, setting the read strength parameter for the read head to zero for time steps at which a difference between (i) a time index for the time step and (ii) a time index for the time step that has the largest weight of any time step when reading from the external memory for the read head at the time step is less than a constant value.

18. The system of claim 13, wherein identifying one or more particular time steps that are more than the threshold number of time steps before the splice time step in the sequence comprises:

determining a half-life value, and identifying as particular time steps each time step that is more than the half-life value before the splice time step in the sequence.

19. The system of claim 13, wherein, for each read head and for each time step, reading from the external memory comprises:

assigning a respective weight to the data written to the external memory at each preceding time step; and generating a read vector that combines the data written to the external memory at each preceding time step in accordance with the respective weights.

20. The system of claim 19, wherein generating a modification for each identified time step from a value prediction generated using the data read from the external memory at the splice time step comprises:

generating the modification for the identified time step from (i) a future value discount factor, (ii) the weight assigned to the identified time step while reading from the external memory at the splice time step and (iii) the value prediction generated using the data read from the external memory at the splice time step.

* * * * *